(12) United States Patent
Niedermeyer et al.

(10) Patent No.: US 12,131,515 B2
(45) Date of Patent: Oct. 29, 2024

(54) REAL-TIME IMAGE TRANSFORMATION MONITORING FOR DISPLAY SYSTEMS

(71) Applicant: Rockwell Collins, Inc., Cedar Rapids, IA (US)

(72) Inventors: Timothy M. Niedermeyer, Tacoma, WA (US); Carmen K. Tseng, Tigard, OR (US); Steven C. Stowe, Tigard, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 388 days.

(21) Appl. No.: 17/685,158

(22) Filed: Mar. 2, 2022

(65) Prior Publication Data

US 2023/0281950 A1 Sep. 7, 2023

(51) Int. Cl.
*G06V 10/44* (2022.01)
*G06T 1/60* (2006.01)
*G06T 7/00* (2017.01)

(52) U.S. Cl.
CPC .............. *G06V 10/443* (2022.01); *G06T 1/60* (2013.01); *G06T 7/0002* (2013.01); *G06T 2207/10016* (2013.01); *G06V 2201/02* (2022.01)

(58) Field of Classification Search
CPC .............. G09G 5/003; G09G 2330/12; G09G 2360/12; G09G 2380/10; G09G 2380/12; G06V 10/443; G06V 2201/02; G06T 1/60; G06T 7/0002; G06T 2207/10016
See application file for complete search history.

(56) References Cited

U.S. PATENT DOCUMENTS

| 8,965,140 B1* | 2/2015 | Xu ......................... H04N 19/14 382/273 |
| 9,269,021 B2 | 2/2016 | Mathews et al. |
| 10,643,573 B2 | 5/2020 | Chaudhari et al. |

(Continued)

FOREIGN PATENT DOCUMENTS

| EP | 2254039 A1 | 11/2010 |
| EP | 2605124 A1 | 6/2013 |
| EP | 3796147 B1 | 11/2021 |

OTHER PUBLICATIONS

Extended European Search Report dated Jul. 31, 2023; European Application No. 23159751.9.

*Primary Examiner* — Congvan Tran
(74) *Attorney, Agent, or Firm* — Suiter Swantz IP

(57) ABSTRACT

A system and method for real-time image transformation monitoring for a display unit receives, via a pixel buffer, pixels of source image data and appends fiducial data to each pixel, the fiducial data corresponding to a reference checksum associated with a transformation map for one or more transformations of the source image into an output image for display. When source image data is read out of the pixel buffer, e.g., as a sequence of pixel datasets, an image transformation monitor extracts the fiducial data appended to each dataset and incorporates each set of extracted fiducial data into a checksum calculation for the current source image. When the transformed output image is complete, the cumulative checksum calculation for the current source image is compared to the reference checksum, determining a system status or detecting a system fault based on whether or not the checksum calculation and reference calculation are equivalent.

15 Claims, 5 Drawing Sheets

(56) References Cited

U.S. PATENT DOCUMENTS

| | | | |
|---|---|---|---|
| 11,001,143 B2 | 5/2021 | Gulati et al. | |
| 11,158,241 B2 | 10/2021 | Lee et al. | |
| 2003/0231785 A1* | 12/2003 | Rhoads | G11B 20/00978 |
| | | | 707/E17.112 |
| 2010/0142838 A1* | 6/2010 | Ivansen | G03F 7/70508 |
| | | | 382/243 |
| 2017/0052973 A1* | 2/2017 | Wang | G06F 16/1727 |
| 2017/0134493 A1* | 5/2017 | Chang | H04L 67/1025 |
| 2019/0034108 A1* | 1/2019 | Chang | H04L 67/1097 |
| 2019/0295452 A1 | 9/2019 | Dunn et al. | |
| 2020/0012829 A1* | 1/2020 | Davidson | G05D 1/0234 |
| 2022/0201159 A1* | 6/2022 | Wang | H04N 5/265 |

* cited by examiner

REAL-TIME IMAGE TRANSFORMATION MONITORING FOR DISPLAY SYSTEMS

GOVERNMENT SUPPORT

This technology was developed with U.S. government support under contract number FA8625-11-C-6600 awarded by the United States Air Force. The U.S. government has certain rights in this invention.

BACKGROUND

Modern display systems may combine a camera-captured image stream with a variety of image processing operations to modify the image stream for optimal display to a user via a display system, e.g., a conventional head-down display (HDD); head-up and helmet-mounted displays (HUD, HMD) worn by a user; or augmented reality, virtual reality, and/or mixed-reality (AR, VR, MR) devices. For example, the image stream may be transformed via additional processing (e.g., enhanced vision and/or synthetic vision systems (EVS, SVS) that augment the image stream with additional information relevant to the scenes portrayed thereby; image filtering or convolution; image distortion for optimal display on a particular display surface, e.g., a transparent or translucent visor functioning as an HMD display surface on which the images are projected). In any or all of these cases, it is important to prevent the presentation of misleading information to the display user. This is especially true in safety-critical scenarios associated with cockpit-based or automobile-based users, who may rely on the display system for real-time or near real-time visual intelligence enabling the user to control an aircraft or vehicle. For example, even minor misalignments may lead to significant errors in depth cues or larger misalignments, which may constitute hazardously misleading information (HMI) that may lead to a catastrophic failure affecting the aircraft/automobile/vehicle, its operator, its payload, and/or its passengers.

Conventional approaches for integrity monitoring of image transformation do exist, but they fail to accurately and comprehensively monitor image transformation across multiple dimensions in real time. For example, display integrity monitors may store a group of critical symbols, checking the accuracy of displayed critical symbols based on lookup tables, but the pool of reference critical symbols is limited and by no means comprehensive. Similarly, distortion monitors may check an appended test pattern region but with large bounds on the expected location and/or alignment of pixels as a result of image distortion.

SUMMARY

In a first aspect, a real-time image transformation monitoring system (e.g., for monitoring transformations of a source image into a transformed output image) is disclosed. In embodiments, the monitoring system includes a pixel buffer for receiving pixel data of a source image and appending to each pixel of source image data fiducial data associated with a reference checksum calculation. For example, the reference checksum is associated with a transformation map, which in turn relates to one or more transformations of the source image by an output image processor. The source image data and appended fiducial data is stored to the pixel buffer. The monitoring system includes an image transformation monitor for, as the output image processor reads out each set of stored source image data, extracting the fiducial data appended to each pixel and incorporating each set of extracted fiducial data into a checksum calculation for the source image. When the transformation of the source image (e.g., by the output image processor) is complete, the image transformation monitor determines a system status by comparing the cumulative checksum calculation for the source image to the reference checksum. For example, a checksum calculation equivalent to the reference checksum indicates a nominal status consistent with correct storage by and operation of the pixel buffer.

In some embodiments, each set of source image data extracted from the pixel buffer corresponds to a two-dimensional (2D) pixel array within the source image.

In some embodiments, the image transformation monitor determines an image transformation monitor fault if the checksum calculation for the source image does not match the reference checksum.

In some embodiments, the transformation map includes an ordered sequence of transformation addresses, e.g., each transformation address corresponding to a relationship between one or more pixels of the source image and the equivalent pixels of the transformed output image where each pixel dataset extracted from the pixel buffer includes a transformation address of the sequence. The pixel buffer may maintain more than one set of fiducial data and designate a particular set of fiducial data as the current fiducial data appended to each pixel of the source image when received by the pixel buffer.

In some embodiments, the monitoring system includes an independent remote device and/or independent processor (e.g., different than, external to, and/or remotely located from the pixel buffer/image transformation monitor or embodying device/s). For example, the independent processor may calibrate the monitoring system by generating the one or more fiducial datasets maintained by the pixel buffer, each set of fiducial data corresponding to a reference checksum.

In some embodiments, the pixel buffer selects a new or subsequent set of fiducial data for appending to the next source image immediately subsequent to the current source image, such that the fiducial data (and corresponding reference checksum) is changed (at least alternated) for each new source image.

In some embodiments, the image transformation monitor stores a checksum calculation for the source image and compares the subsequent checksum calculation (e.g., for the immediately subsequent source image) to the stored checksum calculation. If, for example, two consecutive checksum calculations are compared and found equivalent, a pixel buffer fault is indicated.

In some embodiments, the transformation addresses include fractional pixel addresses not corresponding to a discrete pixel.

In some embodiments, the transformation maps include transformation-specific maps, e.g., distortion correction maps, image convolution maps, and/or image filtering maps.

In a further aspect, a method for real-time image transformation monitoring in a display system is also disclosed. In embodiments, the method includes receiving, via a pixel buffer, pixels of source image data, the source image to be transformed via one or more image transformations into an output image for display. The method includes, as the source image data is received by the pixel buffer, appending to each pixel of the source image data fiducial data maintained by the pixel buffer. For example, the fiducial data corresponds to a reference checksum for the source image, the reference checksum also associated with a transformation map for the image transformations of the source image. The method includes storing the source image data and appended fiducial data via the pixel buffer. The method includes, as each pixel dataset of source image data is read from the pixel buffer by the output image processor (e.g., for transformation into the output image), extracting the fiducial data appended to each pixel via an image transformation monitor. The method includes incorporating each extracted set of fiducial data into a cumulative checksum calculation for the source image. The method includes, when image transformations of the source image are complete, determining a system status by comparing the cumulative checksum calculation to the current reference checksum; if, for example, the two are equivalent a nominal state of the pixel buffer may be returned.

In some embodiments, the method includes determining an image transformation error status (e.g., a fault of the image transformation monitor) based on a dissimilarity or non-equivalence of the current checksum calculation and the current reference checksum.

In some embodiments, the current transformation map comprises a sequence of transformation addresses within the source image, where each pixel dataset extracted from the pixel buffer includes a transformation address in the sequence, and the method includes designating, via the pixel buffer, a fiducial dataset of one or more fiducial datasets maintained by the pixel buffer as the current fiducial data for the current source image.

In some embodiments, the method includes generating the one or more fiducial datasets via an independent processor external to, or remote from, the image transformation monitoring system. The method includes forwarding the generated fiducial datasets to the pixel buffer.

In some embodiments, the method includes designating, via the pixel buffer, a new or different fiducial dataset of the one or more fiducial datasets maintained by the pixel buffer as the fiducial data to be appended to a new or different source image immediately subsequent to the current (e.g., most recently processed) source image, where the new fiducial data is also associated with a new or different reference checksum.

In some embodiments, the method includes storing, the image transformation monitor, the checksum calculation for the most recently processed source image. The method includes comparing, via the image transformation monitor, the stored checksum calculation and the next checksum calculation. For example, if two consecutive checksum calculations are equivalent, a pixel buffer fault is indicated.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
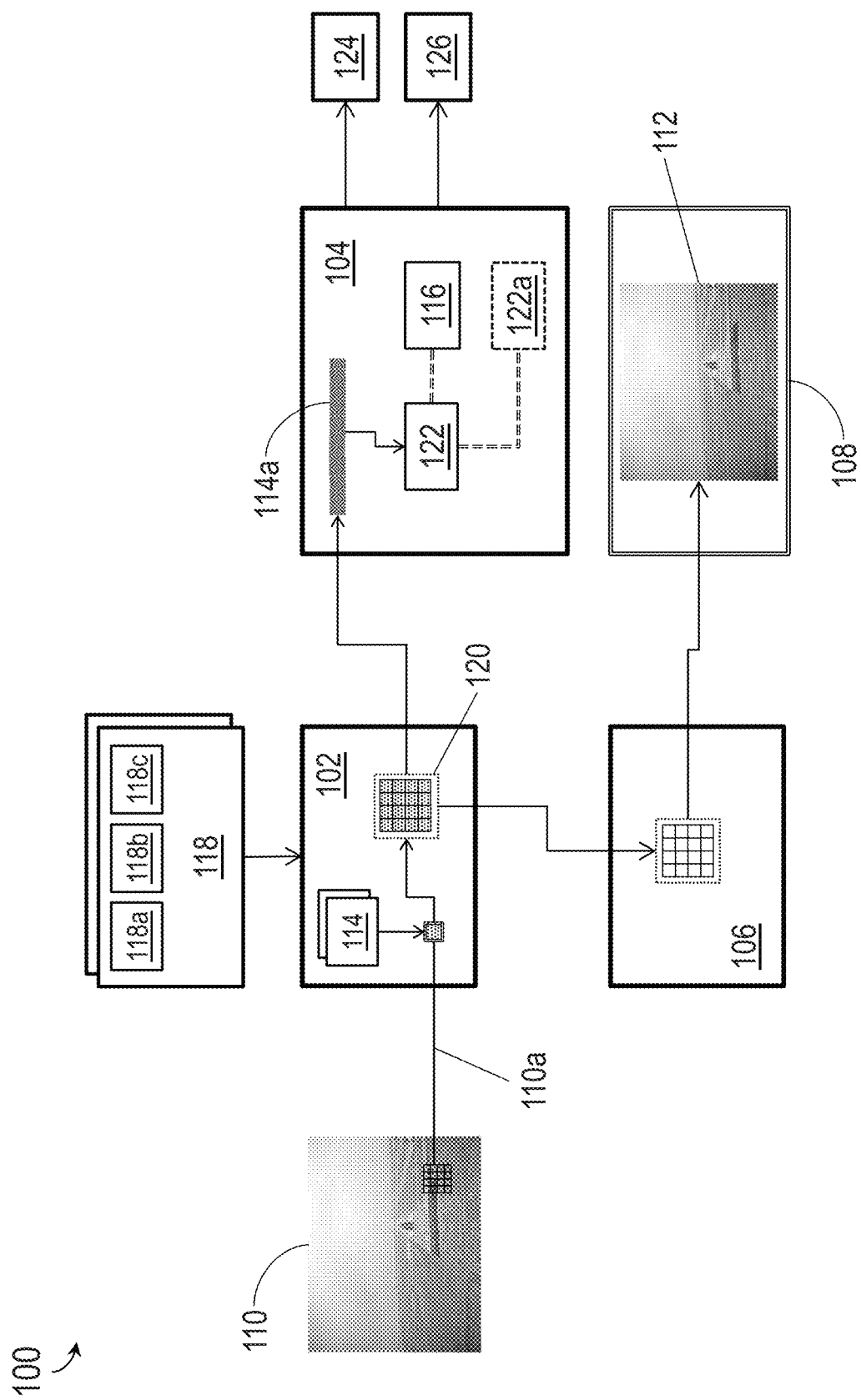
FIG. 1 is a block diagram illustrating a real-time image transformation monitoring system for a display system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a real-time image transformation monitoring system 100 is disclosed. The monitoring system 100 may include a pixel buffer 102, image transformation monitor 104, and output image processor 106. For example, the pixel buffer 102, image transformation monitor 104, and output image processor 106 may be embodied in a single processor or in a single device, e.g., a line replaceable unit (LRU). Alternatively, the pixel buffer 102, image transformation monitor 104, and output image processor 106 may be embodied across multiple processors or physical devices/LRUs in communication with each other.

In embodiments, the monitoring system 100 may be implemented in a cockpit or control center of an aircraft, automobile, or other air-based, land-based, or water-based vehicle. For example, the monitoring system 100 may monitor the transformation of images or image streams captured by a camera or image sensor (not shown) for display via display units 108. Prior to ultimate display to a user via a display unit 108, the images or image streams may be transformed via various types of image processing or image enhancement to optimize display of the images or image streams via the display unit including, but not limited to: augmentation via EVS or SVS symbology; image convolution; image filtering; and/or image distortion. In embodiments, the display unit 108 may include, but is not limited to, any combination of head-down displays (HDD), head-up displays (HUD), helmet-mounted displays (HMD), head-worn displays (HWD), augmented reality (AR) viewers, virtual reality (VR) viewers, and/or mixed reality (MR) viewers.

In embodiments, the transformed image stream for display to the user via the display unit 108 may be based on a source image 110 (e.g., source frame) or continuous sequence of source images. For example, an output image 112 based on the transformed source image 110 may be displayed via the display unit 108 at a predetermined or required minimum frame rate (e.g., 60 fps), such that the output image provides the user with safety-critical visual intelligence in real time or near real time.

In embodiments, the pixel buffer 102 may receive and store source image data 110a (e.g., pixel data) from the source image 110. For example, the pixel buffer 102 may receive all or a portion of the source image data 110a; as the source image data is received, the pixel buffer may append fiducial data 114 to each pixel of source image data. In embodiments, the pixel buffer 102 may maintain multiple sets of fiducial data 114, each set of fiducial data corresponding to a reference checksum 116 (e.g., a current set of fiducial data used for a particular source image 110 will also be associated with a current reference checksum maintained by the image transformation monitor 104). For example, sets of fiducial data 114 may be generated based on predetermined fiducial functions, such that each individual pixel of source image data 110a may have a unique or different element of fiducial data appended thereto. In some embodiments, fiducial functions may have a unique seed value for generating pseudorandom sequences of fiducial data 114, e.g., a linear feedback shift register (LFSR) reset for ensuring unique seeds (and therefore unique fiducial data and a unique reference checksum 116) for at least any two consecutive source images 110.

In embodiments, each set of fiducial data 114 maintained by the pixel buffer 102 may be associated with a transformation map 118. For example, each transformation map 118 may correspond to a specific image transformation or set of image transformations of the source image 110 (e.g., from which the output image 112 may be generated), including, but not limited to: image distortion correction (e.g., distortion maps 118a) for display on a curved surface; image convolution (e.g., convolution maps 118b); image filtering (e.g., filtering maps 118c); image scaling; image decimation; image offset, image alignment, etc.

In embodiments, as the source image data 110a (to which the fiducial data 114 has been appended) is read from the pixel buffer 102 by the output image processor 106, the image transformation monitor 104 may extract the appended fiducial data. For example, the source image data 110a may be read from the pixel buffer 102 by the output image processor 106 as a sequence of discrete pixel datasets 120, each pixel dataset including a group of pixels of source image data and the set of fiducial data (114a) appended thereto.

In embodiments, each set of fiducial data 114a extracted from a pixel dataset 120 may be incorporated by the image transformation monitor 104 into a cumulative checksum calculation 122 for the current source image 110. For example, when the image transformation/s (and the output image 112) associated with the current source image 110 is complete, the image transformation monitor 104 may match the checksum calculation 122 based on each set of extracted fiducial data 114a to the reference checksum 116 also corresponding to the current fiducial data. In embodiments, if the checksum calculation 122 and reference checksum 116 are equivalent or otherwise match, the image transformation monitor 104 may output a nominal system status 124. For example, the nominal status 124 may correspond to normal operations of the pixel buffer 102 and/or high integrity of image transformation operations, and may be associated with one or more integrity assurances including, but not limited to: proper storage of each pixel dataset 120 by the pixel buffer 102, correct designation of the current fiducial data 114 by the pixel buffer, and the proper sequence of transformation addresses comprising the transformation map 118 (e.g., the selected pixel datasets 120 were not only correctly stored by the pixel buffer 102, but extracted from the pixel buffer by the image transformation monitor 104 in the correct order provided for by the current transformation map).

In embodiments, the checksum calculation 122 may be a cumulative checksum calculation corresponding to the current source image 110 or set of source image data 110a, e.g., incorporating cyclic redundancy check (CRC) and/or any other appropriate integrity check and/or hashing algorithms known in the art. For example, when all pixel datasets 120 indicated by the current transformation map 118 are extracted from the pixel buffer 102 (e.g., when the output image 112 based on transformations of the source image data 110a is generated), the cumulative checksum calculation 122 based on the cumulative fiducial data 114a may be compared to the reference checksum 116.

In embodiments, the image transformation monitor 104 may output one or more error statuses 126 based on the comparison of the checksum calculation 122 and reference checksum 116. For example, if the checksum calculation 122 and reference checksum 116 are not equivalent, the error status 126 may indicate a fault in the image transformation monitor 104. In some embodiments, the fiducial data 114 and reference checksum 116 may be changed by the pixel buffer 102 after each source image 110 is processed and transformed. For example, the pixel buffer 102 may select a new set of fiducial data 114 (corresponding to a new reference checksum 116) for each subsequent source image 110.

In embodiments, a checksum calculation 122 may be stored (122a) by the image transformation monitor 104. For example, each stored checksum calculation 122a may also be compared to the immediately subsequent checksum calculation 122 corresponding to the next source image immediately preceding the current source image 110. If a stored checksum calculation 122a is found equivalent to the subsequent checksum calculation 122, the error status 126 may indicate a fault in the pixel buffer 102. For example, a match in two consecutive checksum calculations 122, 122a may indicate a failure of the pixel buffer 102 to load new fiducial data 114 between consecutive source images 110.

Figure 2:
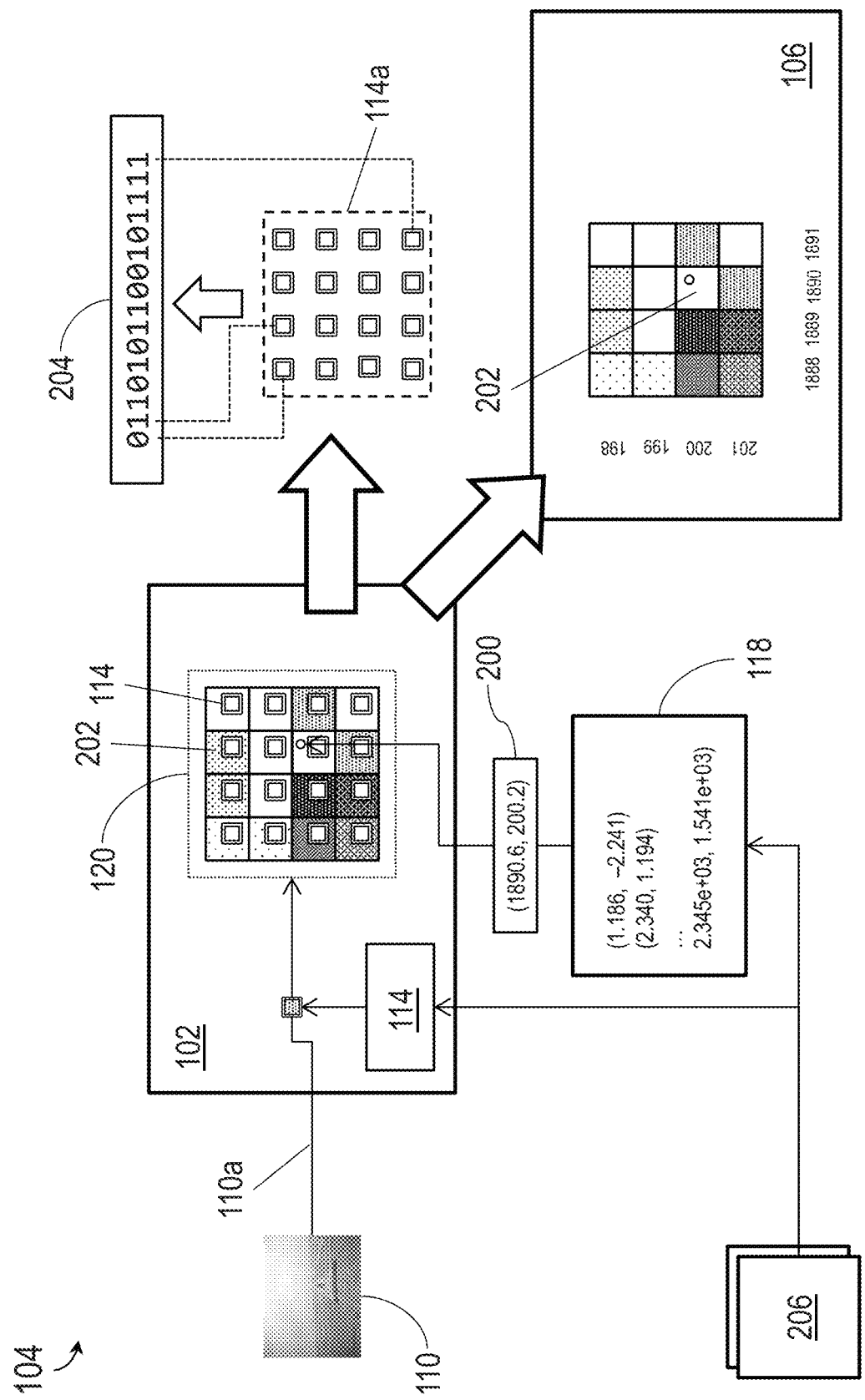
FIG. 2 is a block diagram illustrating the real-time image transformation monitoring system of FIG. 1.

Referring now to FIG. 2, the image transformation monitor 104 is shown.

In embodiments, the source image data 110a stored to the pixel buffer 102 (and to which the pixel buffer has appended fiducial data 114) may be extracted from the pixel buffer 102 by the output image processor 106. For example, the output image processor 106 may sequentially extract from the stored source image data 110a pixel datasets 120. In embodiments, each transformation map 118 may include a sequential list of transformation addresses 200, such that the sequence of transformation addresses determines the sequence of pixel datasets 120 extracted from the pixel buffer 102. For example, each transformation address 200 may define a relationship between a pixel or pixels of source image data 110a and the corresponding pixel/s of the transformed output image (112, FIG. 1) displayed by the display unit (108, FIG. 1). In the simplest case, where there is no pixel buffer 102, the image transformation monitor 104 may extract the fiducial data 114 appended to pixels of source image data 110a individually, and the transformation map 118 may comprise a sequence of transformation addresses 200 where each transformation address corresponds to a discrete pixel of source image data 110a.

In embodiments, transformation addresses 200 in the transformation map 118 may include fractional pixel addresses not corresponding to a discrete pixel 202, e.g., (1.186, −2.241). For example, the source image data 110a appended and stored by the pixel buffer 102 may be extracted from the pixel buffer by the image transformation monitor 104 as a sequence of pixel datasets 120, e.g., two-dimensional (2D) pixel arrays or groups of pixels of source image data, each current or next pixel array corresponding to the current or next transformation address 200 in the sequence. In some embodiments, a pixel dataset 120 or array may include the current transformation address 200 but may not be centered on the transformation address. For example, each pixel dataset 120 or array may comprise an m×n or m×m pixel array (of mn or $m^2$ discrete pixels 202 respectively, where m, n are integers). For example, the pixel dataset 120 corresponding to transformation address 200 (1890.6, 200.2) may be a 4×4-pixel array incorporating the pixel 202 having discrete pixel address (1890, 200) as one of 16 component pixels. In embodiments, the output image processor 106 and image transformation monitor 104 may extract from the pixel buffer 102 pixel datasets 120 or arrays of any size sufficient to allow resampling without adversely affecting system latency.

In embodiments, the image transformation monitor 104 may extract from each pixel dataset 120 the set of fiducial data 114a appended to each component pixel 202 as the component pixels are read out of the pixel buffer 102 by the output image processor 106. For example, the appended fiducial data 114a extracted from each pixel of the pixel array may be incorporated by the image transformation monitor 104 into the checksum calculation (122, FIG. 1) corresponding to the current source image 110. In embodiments, the appended fiducial data 114a extracted from each pixel dataset 120 may be received by the image transformation monitor 104 as an unordered dataset or as a fiducial data sequence 204 of ordered fiducial data.

In some embodiments, fiducial data 114 maintained by the pixel buffer 102 (and, e.g., corresponding reference checksums 116 maintained by the image transformation monitor) may be stored to memory on a device, line replaceable unit (LRU), memory module, or other device in communication with the pixel buffer 102 such that new fiducial data selected by the pixel buffer may be passed to the pixel buffer for each subsequent source image 110. In some embodiments, the monitoring system (100, FIG. 1) may include multiple devices in communication with each other, such that one or more of the pixel buffer 102, the image transformation monitor 104, or the output image processor 106 may be co-located or embodied in different physical devices or interfaces.

In some embodiments, the monitoring system 100 may self-calibrate (e.g., at initial startup or based on, e.g., optical data maps or real-world measurements) by generating fiducial data 114 (and, e.g., the associated reference checksums (116, FIG. 1) and/or transformation maps (118, FIG. 1: 118a-118c) for a cycle of source images 110 via one or more independent processors 206 in communication with the monitoring system. For example, by generating the fiducial data 114, transformation maps 118, and/or reference checksums 116 via processors 206 independent of the monitoring system 100 and forwarding said fiducial data 114, transformation maps 118, and/or reference checksums to the appropriate components of the monitoring system, the transformation maps, fiducial data, and reference checksums may be insulated from any system faults (124, 126; FIG. 1) otherwise detectable by the monitoring system.

Figure 3:
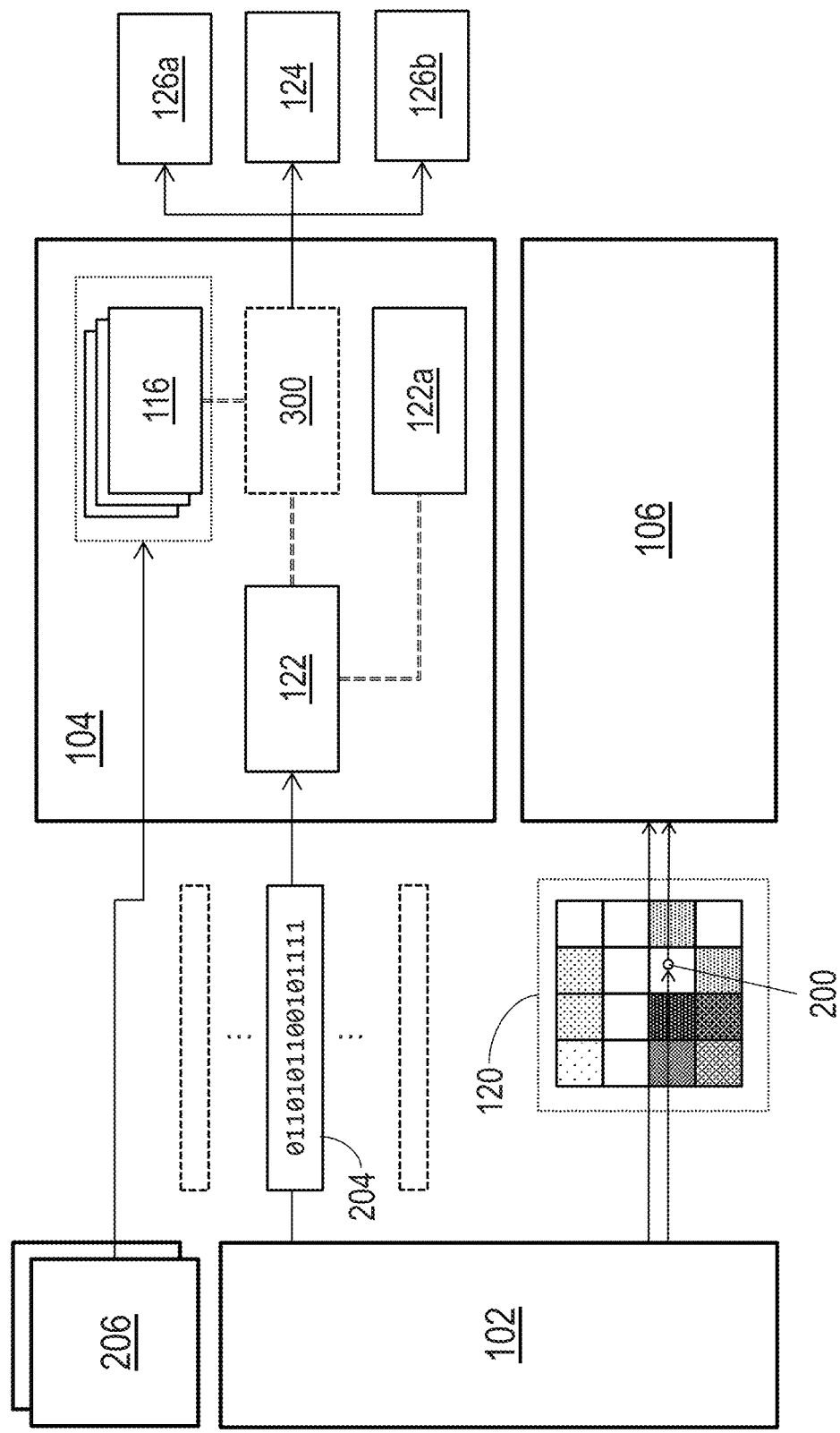
FIG. 3 is a block diagram illustrating the image transformation monitor and downstream image processing of the real-time image transformation monitoring system of FIG. 1.

Referring to FIG. 3, the image transformation monitor 104 is shown.

In embodiments, the image transformation monitor 104 may maintain one or more reference checksums 116 (e.g., generated by the independent processors 206) corresponding to specific sets of fiducial data (114, FIG. 1).

In embodiments, the image transformation monitor 104 may incorporate each sequence 204 (or, e.g., unordered dataset) of received fiducial data (114a, FIG. 2) extracted from each pixel dataset (120, FIG. 2) of source image data (110a, FIG. 1) into a cumulative checksum calculation 122 corresponding to the current source image 110 and fiducial data (114, FIG. 1). For example, the checksum calculation 122 may include or incorporate cyclic redundancy checks (CRC) or any appropriate error detection algorithm known in the art.

In embodiments, the image transformation monitor 104 may detect system statuses (nominal status 124, error statuses 126a-b) by comparing (300) each checksum calculation 122 to the current reference checksum 116. For example, one or more reference checksums 116 corresponding to the current fiducial data (114, FIG. 2) and/or source image 110 may be preloaded to data storage within the image transformation monitor 104, or to other memory or data storage devices in communication with the image transformation monitor or monitoring system 100. In some embodiments, two or more reference checksums 116 may be provided (e.g., corresponding to one or more transformation maps 118, each reference checksum corresponding to a set of fiducial data 114 maintained by the pixel buffer 102) such that the image transformation monitor 104 may designate a new or different reference checksum for each subsequent source image 110, e.g., when the pixel buffer 102 designates a new set of fiducial data 114. For example, a minimum of two sets of fiducial data 114 may allow the pixel buffer to alternate fiducial data between each pair of consecutive source images 110, such that the image transformation monitor 104 may likewise alternate reference checksums 116 between each consecutive pair of source images. In some embodiments, a memory module, LRU, or other device in communication with the image transformation monitor 104 may provide the current reference checksum 116 at the time of calculation or comparison (300). In some embodiments, the independent processor 206 may generate reference checksums 116 during calibration of the monitoring system 100, along with the corresponding fiducial data 114 provided to the pixel buffer 102.

In embodiments, when 1) the checksum calculation 122 and the current reference checksum 116 are compared (300) and found equivalent, and 2) the checksum calculation 122 and the prior checksum calculation 122a (e.g., the stored checksum calculation corresponding to the source image immediately preceding the current source image 110) are found not equivalent (e.g., different, non-matching), the image transformation monitor 104 may output or return a nominal status 124 associated with one or more integrity assurances including, but not limited to: correct storage of each pixel dataset 120 and appending of fiducial data 114 by the pixel buffer 102, a correctly designated current transformation map 118, and the proper sequence of transformation addresses 200 comprising the current transformation map (e.g., the selected transformation addresses and corresponding pixel datasets were not only correct, but extracted from the pixel buffer by the image transformation monitor in the correct order provided for by the transformation map).

In embodiments, the image transformation monitor 104 may output or return one or more error statuses 126a-b based on the comparison 300 of the checksum calculation 122, current reference checksum 116, and/or stored prior checksum calculation 122a. For example, if the checksum calculation 122 and the current reference checksum 116 are found not equivalent, the image transformation monitor 104 may indicate an image transformation error status 126a, e.g., an error in image distortion, image convolution, image filtering (e.g., or some other image transformation) based on the corresponding transformation map (118, FIG. 1: 118a-118c) defining the sequence in which the sequences 204 of fiducial data 114 were extracted from the pixel buffer 102. Similarly, if the comparison 300 results in the checksum calculation 122 being found equivalent to the immediately prior checksum calculation 122a, the image transformation monitor 104 may output or return a pixel buffer error status 126b indicative of a pixel buffer 102 that may be stuck, frozen, or otherwise unable to load new fiducial data 114 for the current source image 110.

In embodiments, output of either an image transformation error status 126a or a pixel buffer error status 126b by the image transformation monitor 104 may result in visual, aural, and/or haptic alerts provided to the user or operator. In some embodiments, the image transformation monitor 104 may preclude display of the associated output image (112, FIG. 1) based on the possibility of hazardously misleading information (HMI) contained therein.

Figure 4A:
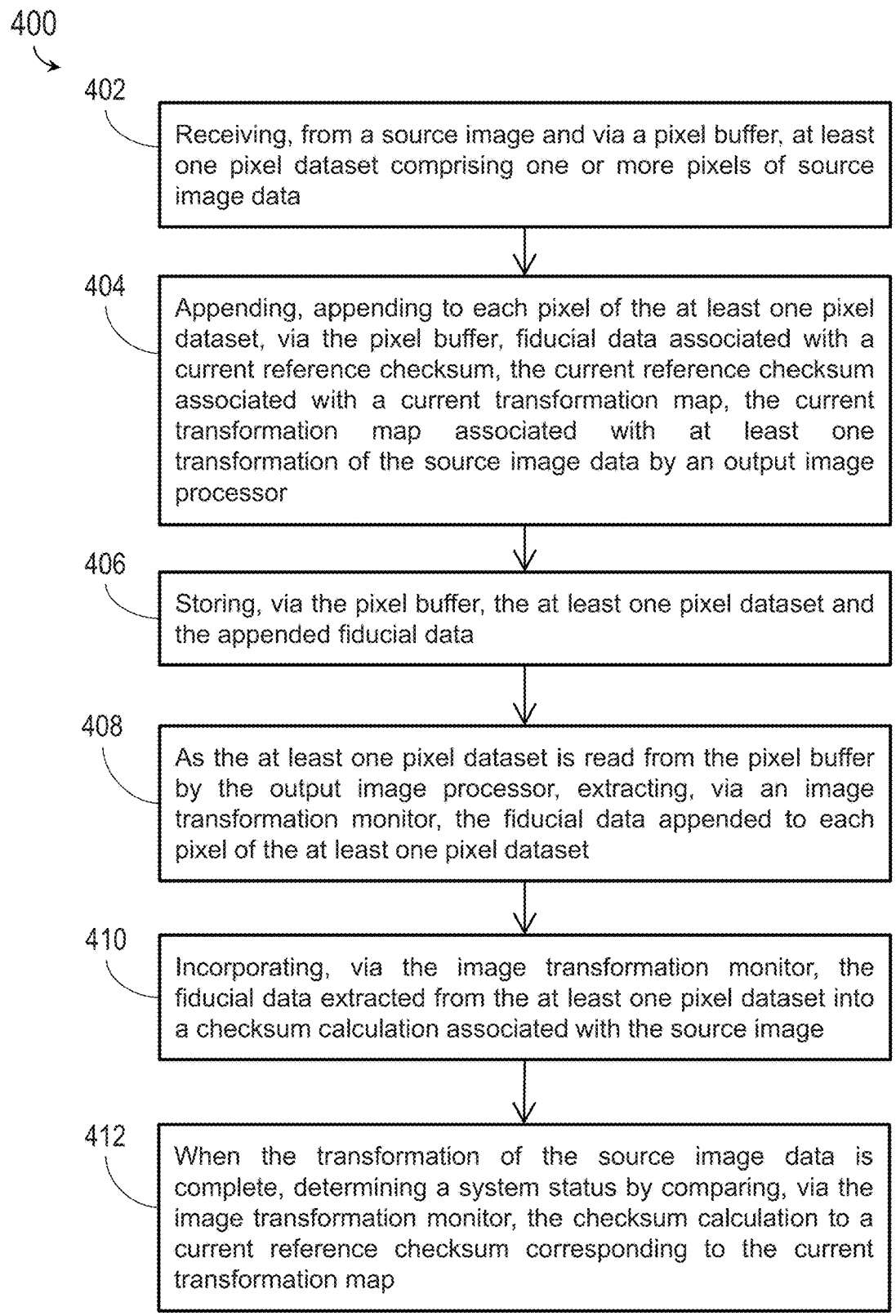
FIGS. 4A through 4D are flow diagrams illustrating a method for real-time image transformation monitoring according to example embodiments of this disclosure.

Referring now to FIG. 4A, the method 400 may be implemented by the real-time image transformation monitoring system 100 and may include the following steps.

At a step 402, the pixel buffer receives one or more pixel datasets of source image data associated with a source image, each pixel dataset including a 2D array or group of component pixels from the source image.

At a step 404, the pixel buffer appends fiducial data to each pixel of the received source image data. For example, each set of fiducial data is associated with a reference checksum for the current source image, the reference checksum also associated with a transformation map, the transformation map in turn associated with one or more transformations of the source image data resulting in an output image for display.

At a step 406, the pixel buffer stores the pixel dataset and appended fiducial data.

At a step 408, as each pixel dataset is read out of the pixel buffer by the output image processor, the image transformation monitor extracts the fiducial data appended to each pixel of the pixel dataset. For example, each set of appended fiducial data may be extracted as a dataset or as an ordered sequence.

At a step 410, the image transformation monitor incorporates the extracted fiducial data into a continuous or cumulative checksum calculation associated with the current source image.

At a step 412, e.g., when the output image based on the transformed source image is complete, the image transformation monitor determines a system status based on the checksum calculation incorporating the fiducial data extracted from each pixel dataset originating with the current source image. For example, the checksum calculation is compared to the current reference checksum; an error status (e.g., an image transformation fault) is indicated if the two checksums are not equivalent. If, however, the checksum calculation and current reference checksum are found equivalent (and, e.g., the current and prior checksum calculations are not equivalent), a nominal system status is indicated. The nominal status is indicative of one or more of: a correct storage of the pixel dataset and appended fiducial data by the pixel buffer, a correctly designated set of fiducial data for the current source image, or a correct sequence of transformation addresses comprising the current transformation map.

Figure 4B:
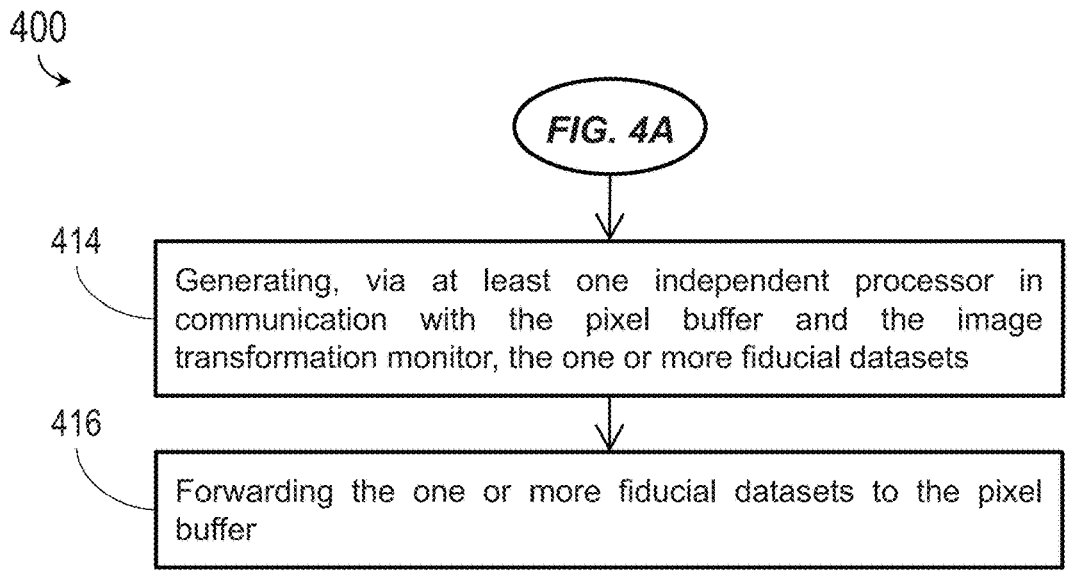

Referring also to FIG. 4B, the method 400 may include additional steps 414 and 416. At the step 414, an independent processor (e.g., external to, or remote from, the monitoring system) generates one or more sets of fiducial data, each set corresponding to a reference checksum. For example, the sets of fiducial data (and corresponding reference checksums) may be generated by a system calibration operation. The sets of fiducial data may be maintained remotely from the monitoring system and forwarded to the pixel buffer when a new set of fiducial data is selected for a new source image.

At a step 416, the independent processor forwards the generated sets of fiducial data to the pixel buffer.

Figure 4C:
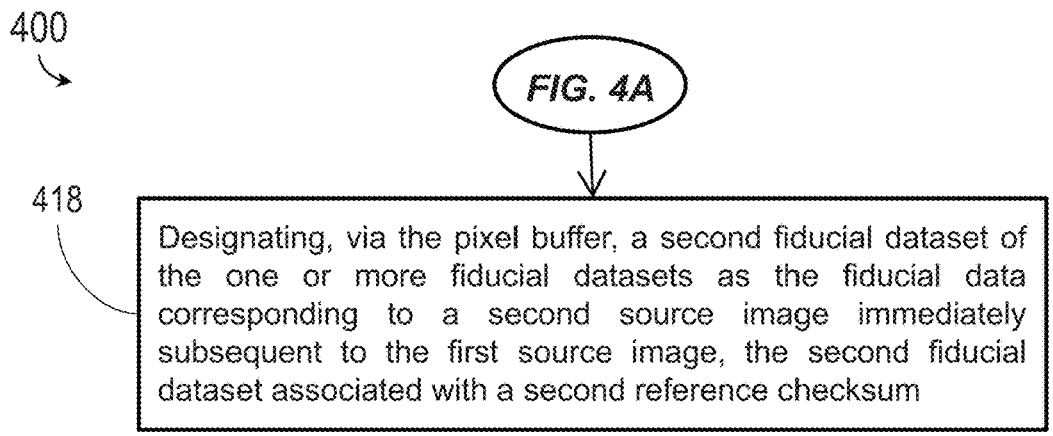

Referring also to FIG. 4C, the method 400 may include an additional step 418. At the step 418, the pixel buffer designates a new or different fiducial dataset as the current fiducial data, e.g., for a new source image immediately subsequent to the current source image. For example, the image transformation monitor may likewise designate as the reference checksum a new or different reference checksum for the new source image).

Figure 4D:
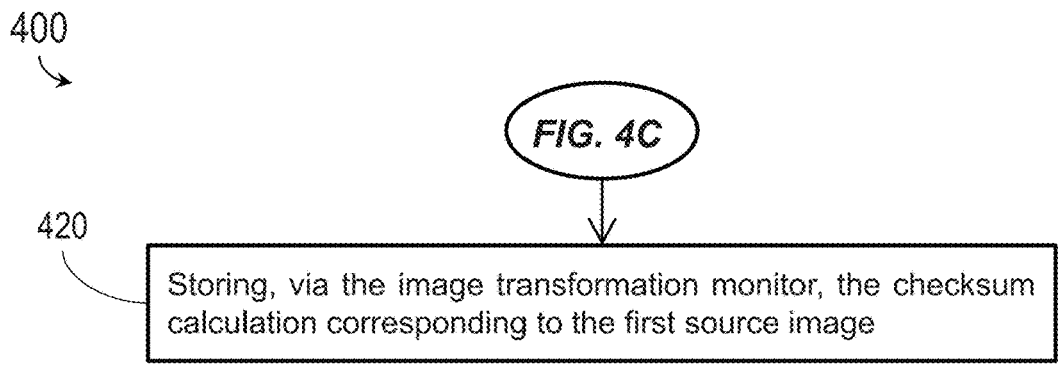

Referring also to FIG. 4D, the method 400 may include an additional step 420. At the step 420, the image transformation monitor stores a completed checksum calculation for a current source image. For example, the stored checksum calculation may be compared to a subsequent checksum calculation for the source image immediately following the current source image; if the two consecutive checksum calculations are found equivalent, an error status of the pixel butter is indicated.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A real-time image transformation monitoring system for a display system, comprising:
    at least one pixel buffer configured to:
        receive at least one pixel dataset associated with a source image, each pixel dataset comprising one or more pixels of source image data;
        append fiducial data associated with a current reference checksum to each pixel of the at least one pixel dataset, the current reference checksum associated with a current transformation map, the current transformation map associated with at least one transformation of the source image data by an output image processor;
        and
        store the at least one pixel dataset and the appended fiducial data;
    and
    at least one transformation monitor in communication with the pixel buffer, the transformation monitor configured to:
        as the output image processor reads the at least one pixel dataset from the pixel buffer, extract from the at least one pixel dataset the fiducial data appended to each pixel;
        incorporate the extracted fiducial data into a checksum calculation associated with the source image;
        and
        when the at least one transformation of the source image is complete, determine a system status by comparing the checksum calculation to the current reference checksum.

2. The real-time image transformation monitoring system of claim 1, wherein the at least one pixel dataset includes at least one two-dimensional (2D) pixel array.

3. The real-time image transformation monitoring system of claim 1, wherein the system status includes at least one monitor fault associated with the image transformation monitor, the monitor fault based on a non-equivalence of the checksum calculation and the current reference checksum.

4. The real-time image transformation monitoring system of claim 1, wherein:
    the current transformation map comprises a sequence of transformation addresses associated with the source image;
    wherein each pixel dataset corresponds to a transformation address of the sequence of transformation addresses;
    and
    wherein the pixel buffer is configured to designate as the fiducial data a fiducial dataset of one or more fiducial datasets maintained by the pixel buffer.

5. The real-time image transformation monitoring system of claim 4, further comprising:
    at least one independent processor in communication with the pixel buffer and the image transformation monitor, the at least one independent processor configured to calibrate the real-time image transformation monitoring system by generating the one or more fiducial datasets, each fiducial dataset corresponding to a reference checksum.

6. The real-time image transformation monitoring system of claim 4, wherein the source image is a first source image, the fiducial dataset is a first fiducial dataset, and the current reference checksum is a first reference checksum, and:
    wherein the pixel buffer is configured to designate a second fiducial dataset of the one or more fiducial datasets as the fiducial data corresponding to a second source image immediately subsequent to the first source image, the second fiducial dataset associated with a second reference checksum.

7. The real-time image transformation monitoring system of claim 6, wherein the image transformation monitor is configured to:
    store the checksum calculation corresponding to the first source image;
    and
    compare the stored checksum calculation to a subsequent checksum calculation corresponding to the second source image;
    wherein the system status includes at least one buffer fault associated with the pixel buffer, the buffer fault based on an equivalence of the checksum calculation and the subsequent checksum calculation.

8. The real-time image transformation monitoring system of claim 4, wherein the sequence of transformation addresses includes at least one fractional pixel address.

9. The real-time image transformation monitoring system of claim 4, wherein the current transformation map includes one or more of:
    a distortion map associated with monitoring a distortion of the source image data;
    a convolution map associated with monitoring a convolution of the source image data;
    or
    a filtering map associated with monitoring a filtering of the source image data.

10. A method for real-time image transformation monitoring in a display system, comprising:
    receiving from a source image and via a pixel buffer, at least one pixel dataset comprising one or more pixels of source image data;
    appending to each pixel of the at least one pixel dataset, via the pixel buffer, fiducial data associated with a current reference checksum, the current reference checksum associated with a current transformation map, the current transformation map associated with at least one transformation of the source image data by an output image processor;

storing, via the pixel buffer, the at least one pixel dataset and the appended fiducial data;

as the at least one pixel dataset is read from the pixel buffer by the output image processor, extracting, via an image transformation monitor, the fiducial data appended to each pixel of the at least one pixel dataset;

incorporating, via the image transformation monitor, the fiducial data extracted from the at least one pixel dataset into a checksum calculation associated with the source image;

and when the transformation of the source image data is complete, determining a system status by comparing, via the image transformation monitor, the checksum calculation to the reference checksum.

11. The method of claim 10, wherein determining a system status by comparing, via the image transformation monitor, the checksum calculation to a reference checksum includes:

determining at least one image transformation fault based on a non-equivalence of the checksum calculation and the reference checksum.

12. The method of claim 10, wherein the current transformation map comprises a sequence of transformation addresses associated with the source image, each pixel dataset corresponding to a transformation address of the sequence of transformation addresses, further comprising:

designating, via the pixel buffer, a fiducial dataset of one or more fiducial datasets maintained by the pixel buffer as the fiducial data.

13. The method of claim 12, further comprising:

generating, via at least one independent processor in communication with the pixel buffer and the image transformation monitor, the one or more fiducial datasets;

and forwarding the one or more fiducial datasets to the pixel buffer.

14. The method of claim 12, wherein the source image is a first source image, the reference checksum is a first reference checksum, and the fiducial data is a first fiducial dataset of the one or more fiducial datasets, further comprising:

designating, via the pixel buffer, a second fiducial dataset of the one or more fiducial datasets as the fiducial data corresponding to a second source image immediately subsequent to the first source image, the second fiducial dataset associated with a second reference checksum.

15. The method of claim 14, further comprising:

storing, via the image transformation monitor, the checksum calculation corresponding to the first source image;

wherein determining a system status by comparing, via the image transformation monitor, the checksum calculation to a reference checksum includes:

determining at least one pixel buffer fault based on a comparison of the checksum calculation corresponding to the first source image and a checksum calculation corresponding to the second source image.

* * * * *